United States Patent
Matsumoto et al.

[11] Patent Number: 5,669,777
[45] Date of Patent: Sep. 23, 1997

[54] ROTARY CONNECTOR

[75] Inventors: Mitsunori Matsumoto; Hiroyuki Bannai; Takehiko Ito, all of Miyagi-ken, Japan

[73] Assignee: Alps Electric Co., Ltd., Tokyo, Japan

[21] Appl. No.: 604,278

[22] Filed: Feb. 21, 1996

[30] Foreign Application Priority Data

Feb. 22, 1995 [JP] Japan .................. 7-033908

[51] Int. Cl.$^6$ .................................................. H01R 35/04
[52] U.S. Cl. ...................................... 439/164; 439/15
[58] Field of Search .................................. 439/164, 15

[56] References Cited

U.S. PATENT DOCUMENTS

| | | | |
|---|---|---|---|
| 4,744,763 | 5/1988 | Suzuki et al. | 439/15 |
| 4,925,122 | 5/1990 | Bannai | 439/15 |
| 4,975,063 | 12/1990 | Ida et al. | 439/15 |
| 5,529,505 | 6/1996 | Kuramoto et al. | 439/164 |

FOREIGN PATENT DOCUMENTS

| | | | |
|---|---|---|---|
| 4419077 | 12/1994 | Japan | 439/164 |
| 406338372 | 12/1994 | Japan | 439/164 |

*Primary Examiner*—Gary F. Paumen
*Attorney, Agent, or Firm*—Guy W. Shoup; Patrick T. Bever

[57] ABSTRACT

A rotary connector which prevents separation of a resilient tongue from a flexible cable so as to prevent buckling. The rotary connector includes first and second housings rotatably connected together and forming an annular space therebetween. A flexible cable and a movable member are received in the annular space. The movable member includes a turntable having a stationary cylinder and a reversing roller, the stationary cylinder including a guide projection. The flexible cable is wound in opposite directions on opposite sides of the movable member and includes a U-shaped reverse portion extending through a gap between the stationary cylinder and the reversing roller. A resilient tongue having a free end portion substantially formed in a linear shape in an unloaded condition is affixed to an inner surface of the flexible cable and to an inner cylinder portion of the second housing. An amount of deformation of the free end portion when it is bent between the stationary cylinder and the reversing roller can be reduced, thereby preventing separation of the tip of the resilient tongue from the flexible cable.

1 Claim, 6 Drawing Sheets

ROTARY CONNECTOR

BACKGROUND OF THE INVENTION

1. Field of the Invention

The present invention relates to a rotary connector which is incorporated in a vehicular steering system for electrically connecting an air bag mechanism mounted on a steering wheel with an electronic system mounted on a body of the vehicle.

2. Description of the Related Art

A rotary connector generally includes a fixed body, a movable body rotatably attached to the fixed body, and a belt-shaped flexible cable connected between the fixed body and the movable body.

Rotary connectors are divided broadly into two types defined by a coiling method of the flexible cable. In a first type of rotary connector, the flexible cable is spirally wound between the movable body and the fixed body. In a second type, the flexible cable includes a first portion wound around the movable body in a first direction, and a second portion wound around the fixed body in an opposite direction, and includes a U-shaped portion connecting the first and second portions. In recent years, rotary connectors of the second type have been preferred because the required length of the flexible cable is shorter than that of the first type, thereby reducing the cost thereof.

FIGS. 5 and 6 are plan views showing a simplified configuration of a rotary connector of the second type proposed by the assignee. FIG. 5 shows a neutral winding state of the flexible cable, and FIG. 6 shows a fully rewound state of the flexible cable. As shown in these drawings, a second housing 101 having an inner cylinder portion 101a is rotatably fitted in the center of a first housing 100 having an outer cylinder portion 100a. A belt-shaped flexible cable 102 is contained in a ring-shaped storage space defined by the first and second housings 100 and 101. Both ends of the flexible cable 102 extend out of the first and second housings 100 and 101 while being fixed to the outer cylinder portion 100a and the inner cylinder portion 101a, respectively. The flexible cable 102 is contained in the storage space while being wound around the outer cylinder portion 100a and the inner cylinder portion 101a in opposite directions, and a U-shaped reverse portion 102a is formed at a position at which a coiling direction thereof is reversed. A resilient tongue 103 formed of a synthetic resin film is affixed to the inner cylinder portion 101a near a fixed end of the flexible cable 2 to partially increase stiffness of the flexible cable 102. An extended portion of the resilient tongue 103 projecting into the storage space is curved inward so as to have substantially the same curvature as that of the outer peripheral surface of the inner cylinder portion 101a in an unloaded condition. This extended portion is affixed to the inner surface of the flexible cable 102. In addition, a movable body 104 is rotatably arranged in the storage space. The movable body 104 includes a ring-shaped turntable 105 having a plurality of pins 105a and one stationary cylinder 105b on the upper surface thereof, and rollers 106 rotatably supported by each of the pins 105a. The reverse portion 102a of the flexible cable 102 passes through an opening formed between the stationary cylinder 105b and an adjacent one of the rollers 106 (hereinafter referred to as a reversing roller 106A) such that the reversed portion 102a is looped around the reversing roller 106A.

The rotary connector constructed as described above is incorporated in a steering system (not shown) of an automobile. For example, the first housing 100 is fixed to a steering column to become a fixed body, and the second housing 101 is fixed to a steering wheel to become a movable body. When the second housing 101 is rotated clockwise in association with the steering wheel from the neutral position shown in FIG. 5, the reverse portion 102a of the flexible cable 102 moves in a clockwise direction within the storage space by an amount of rotation less than that of the second housing 101, the rollers 106 and turntable 105 also move in a clockwise direction following the reverse portion 102a, and a portion of the flexible cable 102, which is twice as long as the amount of movement of the reverse portion 102a, rollers 106 and turntable 105, is unwound from the outer cylinder portion 100a and wound around the inner cylinder portion 101a.

Conversely, when the second housing 101 is rotated counterclockwise in association with the steering wheel from the neutral position shown in FIG. 5, the reverse portion 102a of the flexible cable 102 and the movable body 104 move in a counterclockwise direction by an amount of rotation less than that of the second housing 101, and a portion of the flexible cable 102, which is about twice as long as the amounts of movement of the reverse portion 102a and the movable body 104, is unwound from the inner cylinder portion 101a and rewound around the outer cylinder portion 100a. In this case, the flexible cable 102 wound around the inner cylinder portion 101a somewhat expands radially outward, but further expansion and deviation thereof are prevented by the rollers 106 and the stationary cylinder 105b. In this case, the reverse portion 102a is separated from the reversing roller 106A and drawn out toward the outer cylinder portion 100a while making contact with the stationary cylinder 105b. However, since contact resistance between the reverse portion 102a and the stationary cylinder 105b is very low, the flexible cable 102 wound around the inner cylinder portion 101a is smoothly drawn out toward the reverse portion 102a and rewound around the outer cylinder portion 100a.

Various inspection procedures are performed before a rotary connector is incorporated in the steering system of an automobile. These inspection procedures are performed to check whether or not the second housing 101 rotates smoothly and whether or not the amount of rotation of the second housing is proper. During the procedure, an operator rotates the second housing 101 in a rewinding direction of the flexible cable 101 such that the entire flexible cable 102 is fully rewound on the outer cylinder portion 100a, as shown in FIG. 6, whereby no portion thereof remains wound around the inner cylinder portion 101a. Because stiffness of the flexible cable 102 at the connecting portion of the inner cylinder portion 101a is increased by the resilient tongue 103, the second housing 101 cannot be rotated further. Therefore, reversal and buckling of the flexible cable 102 at the inner cylinder portion 101a is prevented by the resilient tongue 103.

In the conventional rotary connector described above, when the flexible cable 102 is fully rewound during the inspection procedures, the resilient tongue 103 is looped by the reversing roller 106A together with the flexible cable 102 such that the resilient tongue 103 is curved outward along the reversing roller 106A. However, since the resilient tongue 103 is curved inward to have substantially the same curvature as that of the outer peripheral surface of the inner cylinder portion 101a in an unloaded condition, and has a high stiffness as compared with the flexible cable, the resilient tongue 103 resists bending into the shape of the flexible cable 102 when it is curved outward along the reversing roller 106A. As a result, when the flexible cable 102 is rewound and tightened over and over again, various problems are caused. For example, the tip of the resilient tongue 103 is separated from the flexible cable 102 and collides with the stationary cylinder 105, as shown in FIG. 7, thereby stopping the rotation of second housing 101 in the course of rewinding. Further, the extended portion of the resilient tongue 103 can become completely separated from the flexible cable 102, whereby the buckling prevention function of the resilient tongue 103 is lost.

SUMMARY OF THE INVENTION

It is an object of the present invention to provide a rotary connector which reliably prevents separation of the resilient tongue from the flexible cable.

To achieve the above object, the present invention provides a rotary connector which includes a first and a second housings connected so as to be coaxial and rotatable relative to each other; a flexible cable having first and second portions wound in opposite directions and connected by a U-shaped reverse portion, the flexible cable being housed within a ring-shaped storage space defined between an outer cylinder portion of the first housing and an inner cylinder portion of the second housing, with ends of the flexible cable being fixed to the inner cylinder portion and outer cylinder portion, respectively; a movable body arranged rotatably within the storage space and having an opening through which the reverse portion of the flexible cable passes; and a resilient tongue connected to the inner cylinder, the resilient tongue having an extended portion projecting into the storage space and being affixed along an inner surface of the flexible cable, wherein the extended portion of the resilient tongue is formed with a curved base portion to which the resilient tongue is affixed, and a free end portion having a curvature which is smaller than that of the base portion in an unloaded condition.

During inspection of the rotary connector, when the first or second housing is excessively rotated to rewind the flexible cable, the end portion of the flexible cable which is attached to the inner cylinder portion is strengthened by the resilient tongue, thereby preventing the end portion from reversal and buckling. An extended portion of the resilient tongue affixed to the flexible cable is formed with the curved base portion, and the free end portion having a curvature smaller than that of the base portion in an unloaded condition. Thus, the tip of the resilient tongue, when it is bent in the rewound condition, is deformed by a small amount so that separation of the resilient tongue from the flexible cable is prevented.

DESCRIPTION OF THE PREFERRED EMBODIMENTS

An embodiment of the present invention will now be described with reference to FIGS. 1 through 4.

Figure 1:
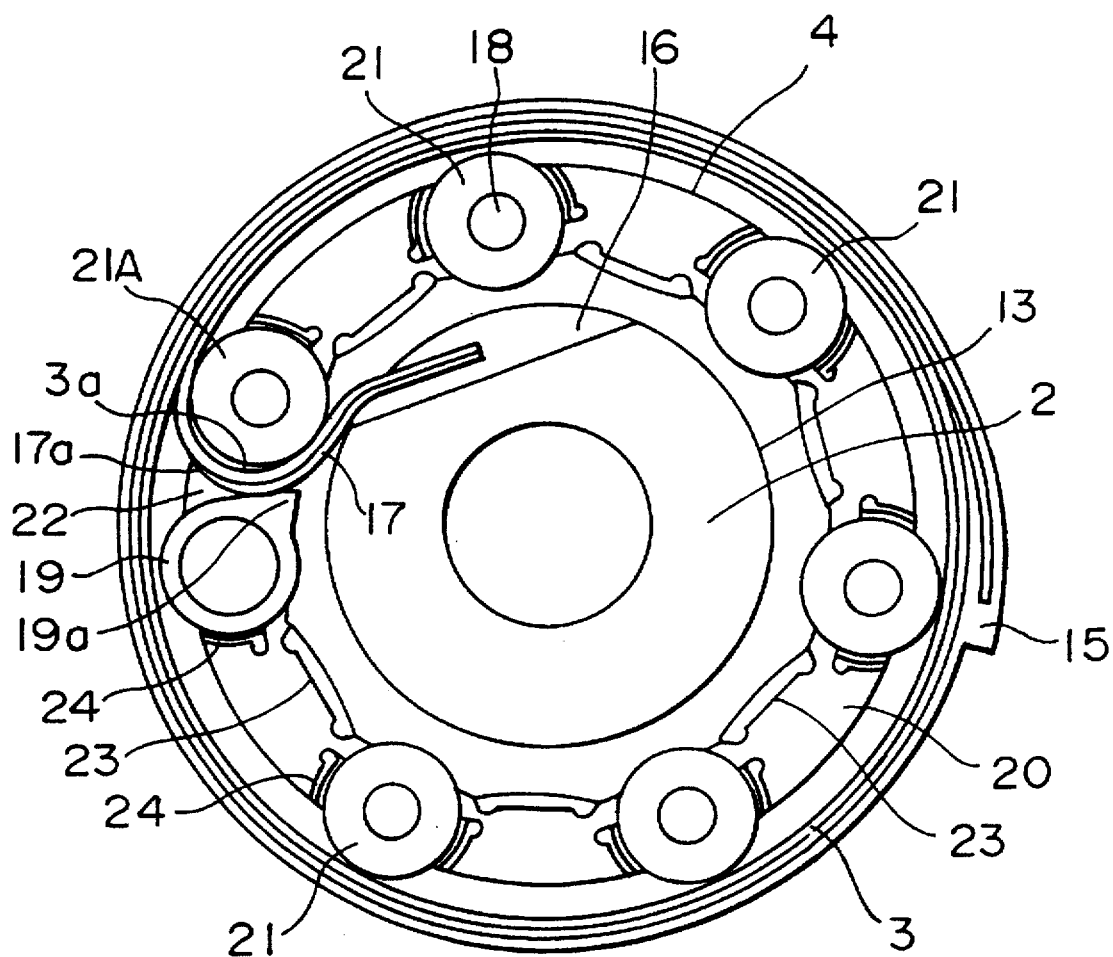
FIG. 1 is a plan view showing a rotary connector according to an embodiment of the present invention.
Figure 2:
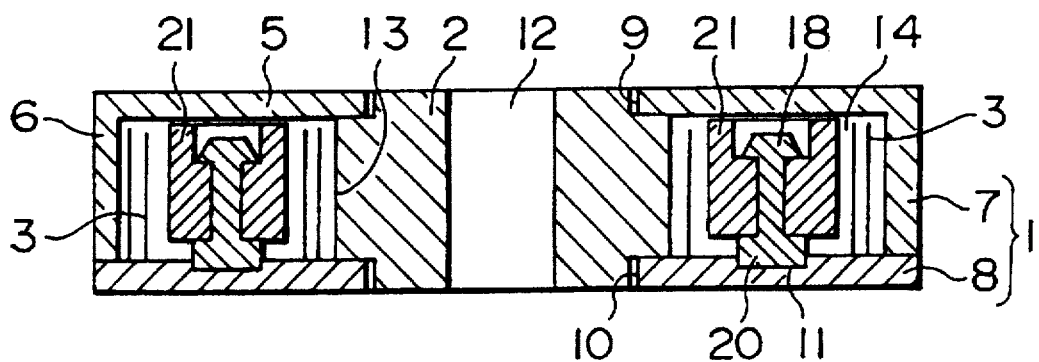
FIG. 2 is a vertical sectional view of the rotary connector of FIG. 1.
Figure 3:
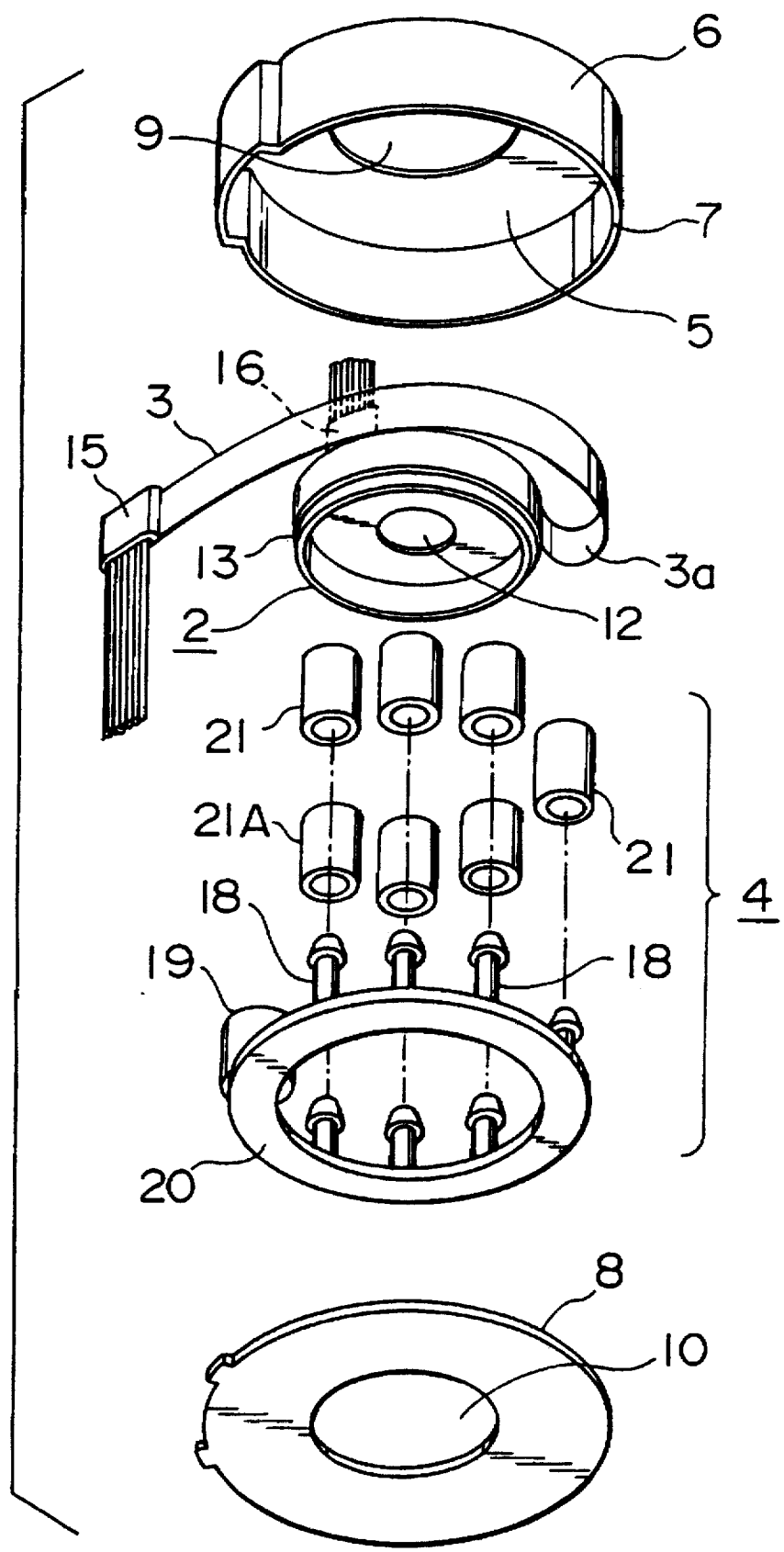
FIG. 3 is an exploded perspective view of the rotary connector of FIG. 1.

FIG. 1 is a plan view of a rotary connector according to an embodiment of the present invention, wherein a top cover is omitted. As shown in FIGS. 1 and 2, the rotary connector according to this embodiment includes a first housing 1, a second housing 2 rotatably attached to the first housing 1, a flexible cable 3 located between the housings 1 and 2, and a movable body 4 rotatably arranged between the housings 1 and 2.

The first housing 1 includes an upper case 7 having an outer cylinder portion 6 integrally formed with the outer peripheral edge of a top plate 5, and a lower cover 8 joined with the lower end of the outer cylinder portion 6. Center holes 9 and 10 are formed in the centers of the top plate 5 of the upper case 7 and the lower cover 8, respectively, and a ring-shaped guide groove 11 is formed on the inner surface of the lower cover 8. The second housing 2 includes a cylindrical body having a shaft insertion hole 12 at the center thereof, and the upper and lower ends of an outer peripheral edge thereof are guided by the center holes 9 and 10 such that the second housing 2 is rotatably connected to the first housing 1. An outer peripheral surface of the second housing 2 forms an inner cylinder portion 13 of the rotary connector. Finally, a ring-shaped storage space 14 is defined between the top plate 5, outer cylinder portion 6 and lower cover 8 of the first housing 1, and the inner cylinder portion 13 of the second housing 2.

The flexible cable 3 is composed of a belt-shaped flat cable in which parallel lead wires are laminated by a pair of insulating films. For example, a flat cable having five lead wires may be used. One end of the flexible cable 3 is connected to a first connector 15 which is fixed to the outer cylinder portion 6. The other end of the flexible cable 3 is connected to a second connector 16 which is fixed to the inner cylinder portion 13 and extends out of the second housing 2 through the second connector 16. As shown in FIG. 1, the flexible cable 3 is housed within the storage space 14 in such a manner that it is wound clockwise from the first connector 15 to the inner wall of the outer cylinder portion 6, reversed therefrom in a U-shape (hereinafter, referred to as a reverse portion 3a), and wound counterclockwise around the outer wall of the inner cylinder portion 13. A resilient tongue 17 formed of a film material having a high flexibility such as polyethylene terephthalate (PET) is affixed to the inner surface of the flexible cable 3 near the inner cylinder portion 13. The resilient tongue 17 is fixed to the inner cylinder portion 13 together with the end of the flexible cable 3.

The movable body 4 includes a ring-shaped turntable 20 having a plurality of pins 18 and one stationary cylinder 19 extending from an upper surface thereof, and rollers 21 rotatably supported on the pins 18. One of the rollers 21 which faces the stationary cylinder 19 across an opening 22 is referred to below as a reversing roller 21A. As shown in FIG. 1, first ribs 23 are provided on the inner peripheral edge of the turntable 20. These first ribs 23 are formed between the reversing roller 21A and an adjacent roller 21, between the stationary cylinder 19 and an adjacent roller 21, and between adjacent pairs of rollers 21 with small clearances. Second ribs 24 are also provided on the turntable 20 near the ends of the first ribs 23. These second ribs 24 act as auxiliary ribs which substantially decrease the clearances of the first ribs 23. In addition, a guide projection 19a is integrally molded on the peripheral surface of the stationary cylinder 19, and the guide projection 19a projects along the peripheral surface of the reversing roller 21A. The movable body 4 is rotatably guided in the storage space 14 by fitting the turntable 20 into the guide groove 11 formed in the lower cover 8. The reverse portion 3a of the flexible cable 3 passes through the opening 22 and is looped around the reversing roller 22A, and the first and second ribs 23 and 24 prevent the reverse portion 3a from being erroneously looped around a roller 21 other than the reversing roller 21A during assembly.

Figure 4:
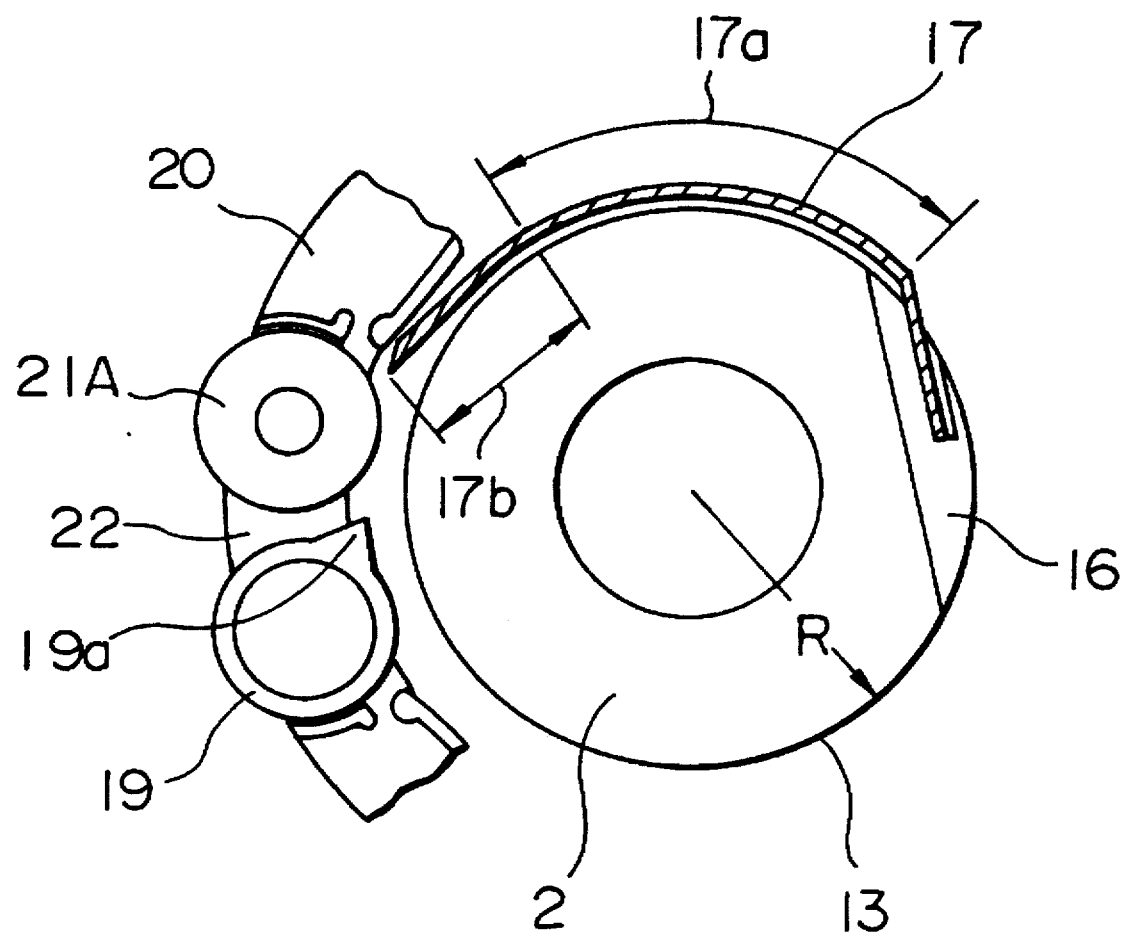
FIG. 4 is a plan view showing an unloaded condition of a resilient tongue provided in the rotary connector.
Figure 5:
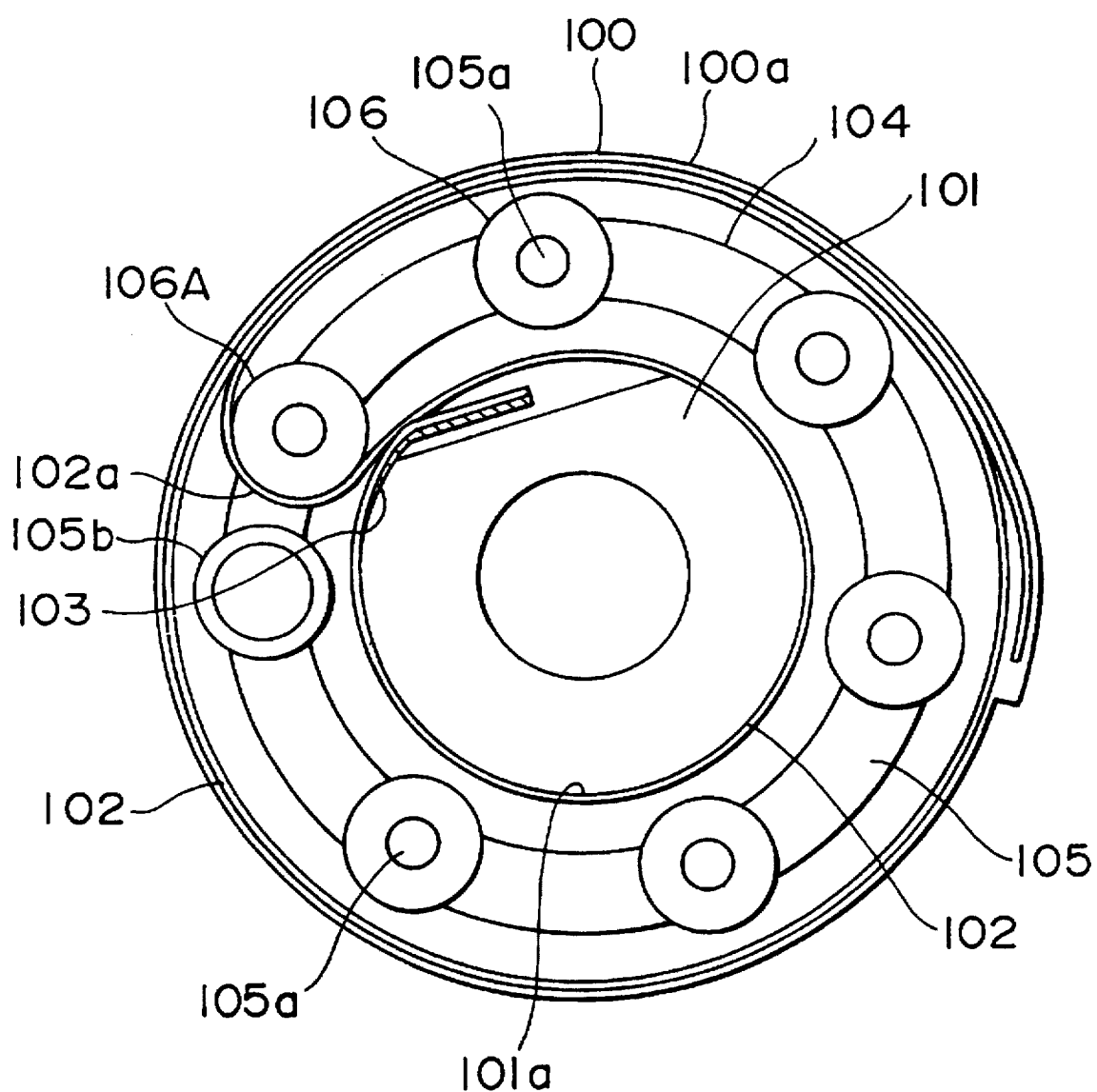
FIG. 5 is a plan view showing a main part of a rotary connector previously proposed by the assignee of the present invention.
Figure 6:
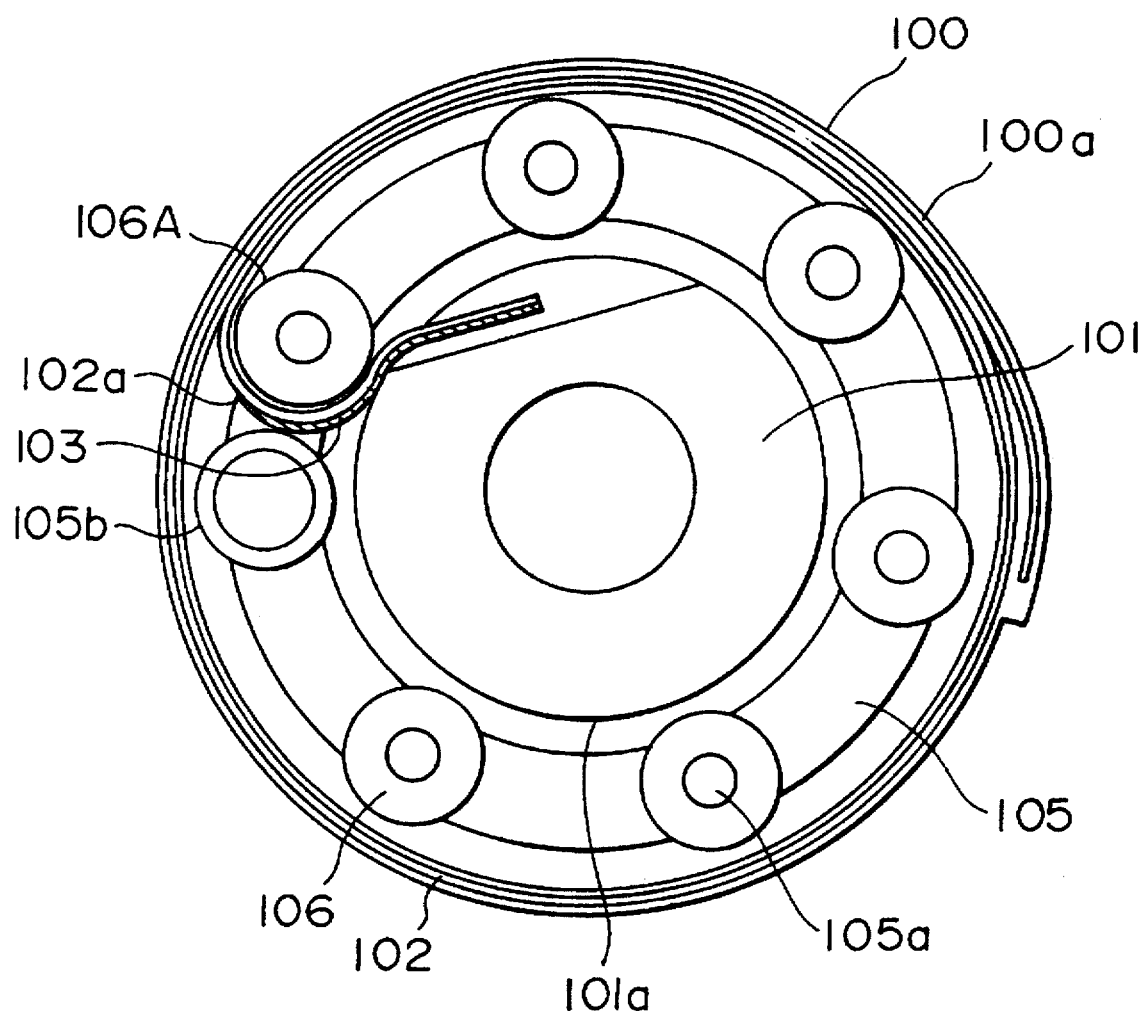
FIG. 6 is a plan view showing a rewound condition of the rotary connector of FIG. 5.
Figure 7:
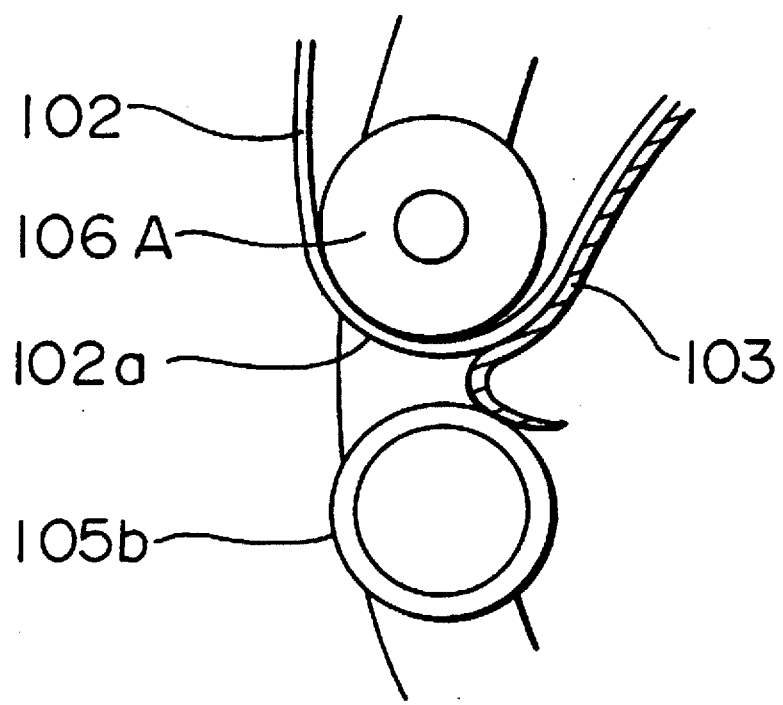
FIG. 7 is an explanatory view showing deficiency of the rotary connector of FIG. 5.

As shown in FIG. 4, the resilient tongue 17 includes a base curved portion 17a which is fixed to the inner cylinder portion 13, and a free end portion 17b extending from the base curved portion 17a. The base curved portion 17a and free end portion 17b have different curvatures in an unloaded condition. That is, the base curved portion 17a has the same curvature as that of the inner cylinder portion 13 of radius R, while the free end portion 17b is formed with a curvature which is smaller than that of the base curved portion 17a, preferably, in an approximately linear shape. The resilient tongue 17 is affixed to the inner surface of the flexible cable 3.

The operation of the rotary connector according to the present invention will now be described in which the first housing 1 is used as a fixed body and the second housing 2 is used as a movable body. In this example, the first housing 1 is fixed on a steering column, and lead wires extending from the upper case 7 are connected to an air bag driving circuit, horn circuit and the like mounted on the vehicle body after the rotary connector passes an inspection procedure, which is described below. The second housing 2 is connected to a steering shaft, steering wheel and the like, and lead wires extending from the second housing 2 are connected to an air bag inflater and a horn switch mounted on the steering wheel.

During use of the rotary connector, when the steering wheel is turned clockwise or counterclockwise, a turning force is transmitted to rotate the second housing 2 clockwise or counterclockwise. For example, when the second housing 2 is rotated clockwise from a neutral position of the steering wheel, the reverse portion 3a of the flexible cable 3 moves in a clockwise direction by an amount less than that of the second housing 2, the turntable 20 also moves in a clockwise direction following the reverse portion 3a because the reversing roller 21A is pulled by the reverse portion 3a, and a portion of the flexible cable 3, which is twice as long as the amounts of movement of the reverse portion 3a and turntable 20, is unwound from the outer cylinder portion 6 and wound around the peripheral surface of the inner cylinder portion 13. In this case, the reverse portion 3a is separated from the stationary cylinder 19 and pulled toward the inner cylinder portion 13 while being in contact with the reversing roller 21A. Thus, the reversing roller 21A rotates counterclockwise around its axis, and the flexible cable 3 wound around the outer cylinder portion 6 contacts the rollers 21 to rotate them counterclockwise so that the flexible cable 3 is smoothly pulled toward the reverse portion 3a and wound on the inner cylinder portion 13 through the reverse portion 3a.

Conversely, when the second housing 2 is rotated counterclockwise from a neutral position of the steering wheel, the reverse portion 3a of the flexible cable 3 moves in a counterclockwise direction by an amount less than that of the second housing 2, the turntable 20 also moves in a counterclockwise direction following the reverse portion 3a because the reversing portion 3a is separated from the reversing roller 21A and presses against the stationary cylinder 19, and a portion of the flexible cable 3, which is twice as long as the amounts of movement of the reverse portion 3a and turntable 20, is unwound from the inner cylinder portion 13 and rewound around the outer cylinder portion 6. In this case, although a clockwise rotating force produced by the flexible cable 3 as it expands radially outward from the inner cylinder portion 13 and a counterclockwise rotating force produced by the reverse portion 3a act on the stationary cylinder 19, the stationary cylinder 19 does not rotate like rollers 21 because it is fixed to the turntable 20. Therefore, a turning force which offsets drawing-out of the reverse portion 3a does not act on the stationary cylinder 19, and the flexible cable 3 wound around the inner cylinder portion 13 contacts the rollers 21 to rotate them clockwise so that the flexible cable 3 is smoothly pulled toward the reverse portion 3a and rewound on the outer cylinder portion 6 through the reverse portion 3a.

The rotary connector constructed as described above is subjected to various inspecting procedures before being incorporated into the steering system to check whether or not the second housing 2 rotates smoothly and whether or not the amount of rotation of the second housing is proper. During inspection, when an operator rotates the second housing 2 in a rewinding direction, the entire flexible cable 3 is rewound on the outer cylinder portion 6 at the end rewinding position, as shown in FIG. 1, whereby no portion thereof remains wound around the inner cylinder portion 13. Because stiffness of the flexible cable 3 at the portion connected to the inner cylinder portion 13 is increased by the resilient tongue 17, the second housing 2 cannot be rotated further, whereby reversal and buckling of the flexible cable 3 at the inner cylinder portion 13 can be prevented by the resilient tongue 17. In this case, the free end portion 17b of the resilient tongue 17 is bent outward along the outer peripheral surface of the reversing roller 21A. Because the free end portion 17b has a substantially linear shape in an unloaded condition, when it is bent by the reversing roller 21A, the free end portion 17b is deformed by a small amount from its original linear shape, so that a separation of the tip of the resilient tongue 17 from the flexible cable 3 is prevented. In addition, when the tip of the resilient tongue enters the opening 22, a sudden bending stress does not act on the free end portion 17b because the free end portion 17b contacts the stationary cylinder 19 along the guide projection 19a. Moreover, since the guide projection 19a projects along the peripheral surface of the reversing roller 21A, it prevents the free end portion 17b located within the opening 22 from being separated from the flexible cable 3. This also prevents the resilient tongue 17 from being separated from the flexible cable 3.

In the embodiment described above, the first housing 1 is used as a fixed body and the second housing 2 is used as a movable body. Conversely, however, the first housing 1 may be used as a movable body and the second housing 2 may be used as a fixed body.

In addition, in the embodiment as described above, the stationary cylinder 19 having the guide projection 19a is shaped in a hollow configuration. However, even if the stationary cylinder 19 is shaped in a solid configuration, a similar effect can be obtained, although the total weight of the movable 4 increases slightly.

As described above, according to the rotary connector of the present invention, the resilient tongue prevents reversal and buckling of the flexible cable, and is formed with a base curved portion which is fixed to the inner cylinder portion and a free end portion having a curvature smaller than that of the base curved portion in an unloaded condition. Thus, the tip of the resilient tongue, when it is bent around a reversing roller, is deformed by a small amount from its original substantially linear shape, thereby reliably preventing the resilient tongue from being separated from the flexible cable.

In addition, when the reversing roller is provided on the movable body, and the guide projection is formed on the stationary cylinder facing the reversing roller, when the free end portion of the resilient tongue enters a space between the reversing roller and the stationary cylinder, it is prevented by the guide projection from being separated from the flexible cable, whereby the separation of the resilient tongue is effectively prevented.

What is claimed is:

1. A rotary connector comprising:

a first housing having an outer cylinder portion;

a second housing having an inner cylinder portion, the second housing being coaxially and rotatably connected to the first housing such that an annular storage space is defined between the outer cylinder portion and the inner cylinder portion;

a flexible cable received within the annular storage space, the flexible cable including a first portion wound in a first direction, a second portion wound in a second direction, and a U-shaped reverse portion connecting the first and second portions, the flexible cable having a first end fixed to said inner cylinder portion and a second end fixed to said outer cylinder portion;

a movable body rotatably received within said storage space and having an opening through which the reverse portion of said flexible cable passes; and a resilient tongue having a fixed end connected to said inner cylinder and an extended portion projecting into said storage space, the resilient tongue being affixed along an inner surface of said flexible cable, wherein the extended portion of said resilient tongue is formed with a base portion having a first curvature, and a free end portion having a second curvature which is smaller than the first curvature in an unloaded condition;

wherein said movable body includes a reversing roller on which the reverse portion of said flexible cable is wound, and a stationary cylinder facing said reversing roller, wherein a guide projection projecting along the outer peripheral surface of said reversing roller is formed on said stationary cylinder.

* * * * *